United States Patent
Bailey et al.

(10) Patent No.: US 7,526,674 B2
(45) Date of Patent: Apr. 28, 2009

(54) METHODS AND APPARATUSES FOR SUPPLYING POWER TO PROCESSORS IN MULTIPLE PROCESSOR SYSTEMS

(75) Inventors: Warren D. Bailey, Pittsboro, NC (US); Srinivas Cheemalapati, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/315,642

(22) Filed: Dec. 22, 2005

(65) Prior Publication Data

US 2007/0174698 A1 Jul. 26, 2007

(51) Int. Cl.
*G06F 11/00* (2006.01)

(52) U.S. Cl. ............... 714/14; 307/64; 324/512

(58) Field of Classification Search ........... 714/14, 714/22; 324/512, 522, 537; 307/64
See application file for complete search history.

(56) References Cited

U.S. PATENT DOCUMENTS

| | | | | |
|---|---|---|---|---|
| 4,143,283 A | * | 3/1979 | Graf et al. | 307/66 |
| 4,355,240 A | * | 10/1982 | Hamilton | 307/44 |
| 4,356,550 A | * | 10/1982 | Katzman et al. | 714/14 |
| 4,433,390 A | * | 2/1984 | Carp et al. | 714/23 |
| 4,551,841 A | * | 11/1985 | Fujita et al. | 714/22 |
| 4,607,330 A | * | 8/1986 | McMurray et al. | 714/14 |
| 4,639,864 A | * | 1/1987 | Katzman et al. | 714/14 |
| 4,812,672 A | * | 3/1989 | Cowan et al. | 307/64 |
| 5,036,455 A | * | 7/1991 | Atwood | 714/22 |
| 5,212,797 A | * | 5/1993 | Miyake et al. | 714/14 |
| 5,325,363 A | * | 6/1994 | Lui | 714/6 |
| 5,400,341 A | * | 3/1995 | Makino et al. | 713/340 |
| 5,498,913 A | * | 3/1996 | Moritani | 307/64 |
| 5,598,041 A | * | 1/1997 | Willis | 307/43 |
| 5,664,089 A | * | 9/1997 | Byers et al. | 714/14 |

(Continued)

FOREIGN PATENT DOCUMENTS

JP   2002-116921   4/2002

(Continued)

OTHER PUBLICATIONS

TDB, IBM Technical Disclosure Bulletin, "Processor Power Adapter," Nov. 1981, pp. 2702-2703.

(Continued)

*Primary Examiner*—Robert Beausoliel
*Assistant Examiner*—Joshua P Lottich
(74) *Attorney, Agent, or Firm*—Cynthia S. Byrd; Schubert Osterrieder & Nickelson PLLS (57) ABSTRACT

Methods and apparatuses for supplying power to processors in multiple processor systems are disclosed. Embodiments comprise a method of monitoring a parameter that is related to a first voltage potential coupled to the processor. When the parameter or condition monitored indicates that the first voltage is bad or faulty, the method generally involves isolating the voltage from the processor, disabling or resetting the processor, and coupling a second voltage potential to the processor. The method may also allow the computer system to continue operating with the processor disabled. Other embodiments comprise an error detection circuit for detecting an error related to a first voltage regulator, a disabling circuit to disable the first voltage regulator in response to the error, a processor isolating circuit, and a voltage switching circuit to supply voltage from a second voltage regulator to the processor.

22 Claims, 8 Drawing Sheets

U.S. PATENT DOCUMENTS

| | | | |
|---|---|---|---|
| 5,687,308 A * | 11/1997 | Jardine et al. | 714/4 |
| 5,737,513 A | 4/1998 | Matsuda et al. | |
| 5,739,597 A * | 4/1998 | Bailey et al. | 307/85 |
| 5,774,736 A * | 6/1998 | Wright et al. | 713/330 |
| 5,834,856 A * | 11/1998 | Tavallaei et al. | 307/64 |
| 5,958,069 A * | 9/1999 | Kawasaki et al. | 714/11 |
| 6,031,743 A * | 2/2000 | Carpenter et al. | 363/65 |
| 6,035,261 A * | 3/2000 | Carpenter et al. | 702/59 |
| 6,105,138 A * | 8/2000 | Arakawa et al. | 713/300 |
| 6,154,845 A * | 11/2000 | Ilkbahar et al. | 713/300 |
| 6,178,516 B1 * | 1/2001 | Meade | 713/300 |
| 6,189,107 B1 * | 2/2001 | Kim et al. | 713/300 |
| 6,191,499 B1 * | 2/2001 | Severson et al. | 307/31 |
| 6,195,754 B1 * | 2/2001 | Jardine et al. | 713/324 |
| 6,269,450 B1 * | 7/2001 | Iwata et al. | 713/340 |
| 6,289,467 B1 * | 9/2001 | Lewis et al. | 713/340 |
| 6,327,663 B2 * | 12/2001 | Isaac et al. | 713/300 |
| 6,407,899 B1 * | 6/2002 | Carpenter | 361/86 |
| 6,496,881 B1 | 12/2002 | Green et al. | |
| 6,601,176 B1 * | 7/2003 | Alexander et al. | 713/300 |
| 6,625,753 B1 | 9/2003 | Skogman et al. | |
| 6,792,553 B2 * | 9/2004 | Mar et al. | 713/330 |
| 6,894,405 B2 * | 5/2005 | Yuan | 307/45 |
| 6,904,541 B1 * | 6/2005 | MacArthur et al. | 714/14 |
| 7,006,161 B2 * | 2/2006 | Testin | 348/730 |
| 7,051,233 B2 * | 5/2006 | Fukumori et al. | 714/14 |
| 7,089,133 B1 * | 8/2006 | Williams et al. | 702/87 |
| 7,093,167 B2 * | 8/2006 | Komiya | 714/44 |
| 7,139,937 B1 * | 11/2006 | Kilbourne et al. | 714/47 |
| 7,290,128 B2 * | 10/2007 | Habib | 713/2 |
| 7,334,158 B2 * | 2/2008 | Bibikar et al. | 714/14 |
| 2002/0073347 A1 | 6/2002 | Zafarana et al. | |
| 2004/0032168 A1 | 2/2004 | Allison et al. | |
| 2004/0093533 A1 * | 5/2004 | Chapuis et al. | 714/22 |
| 2004/0215991 A1 * | 10/2004 | McAfee et al. | 713/324 |

FOREIGN PATENT DOCUMENTS

WO      WO0106759 A1      1/2001

OTHER PUBLICATIONS

Chris Connolly, www.gamepc.com/labs/print_content, Dual Opteron Done Right: Tyan's Thunder K8W Motherboard, Sep. 25, 2003, pp. 1-14.

* cited by examiner

METHODS AND APPARATUSES FOR SUPPLYING POWER TO PROCESSORS IN MULTIPLE PROCESSOR SYSTEMS

FIELD

The present invention generally relates to computing systems with multiple microprocessors. More particularly, the present invention relates to methods and apparatuses for supplying power to processors in multiple microprocessor systems.

BACKGROUND

Our society depends heavily upon computer systems in many of our everyday activities. Computer systems, which employ processors, control devices in our homes, in our business offices, in our manufacturing facilities, in our automobiles, and even in outer space aboard space shuttles and geosynchronous satellites. One can find computers and processors in such devices as desktop and laptop computers, mainframe computing systems, and in portable devices, such as mobile telephones and palm-held computers.

In addition to these existing applications, people are continually finding new applications for computer systems. Many of the applications are demanding improved processor performance and taxing modem computer systems. Examples of improved processor performance that computer designers are continually trying to improve include increased processor speed and faster data throughput. Examples of applications demanding improved processor performance are vision and speech recognition, climate or weather modeling, fluid turbulence modeling, human genome mapping, oil reservoir modeling, and ocean circulation modeling. All of these applications require mind-boggling quantities of computational muscle due to the large number of mathematical computations.

To meet the demands of these applications, computer system designers of have changed the architectures of processors, mostly microprocessors, tremendously. For example, computer systems of the 1980's and early 1990's generally had single central processing units that handled data in a linear or sequential fashion. Unfortunately, such sequential architectures only provide finite amounts of computational power, due to physical limitations of the microprocessors. Accordingly, computers today commonly employ multiple processors that crunch numbers simultaneously in various processor architectures, such as in parallel architectures.

As stated, many computing systems today contain multiple processors. Along with increasing the number of processors in computers, designers creating these multi-processor systems also tend to employ various techniques and design methods to tweak additional computing performance from these computer systems. Such techniques and design methods include pipelining, vector processing, and using superscalar architectures. Computer systems employing these techniques and design methods have generally followed Moore's Law, which states that the number of transistors and resistors on a chip doubles every eighteen months. Today it is not uncommon to find advanced computer system chips that contain millions, even billions, of transistors.

Unfortunately, computer systems and computer chips that employ increasing numbers of transistors and other integrated circuit elements tend to fail more often than systems and devices with fewer elements. To combat these increasing failure rates, computer manufacturers employ various design techniques that tend to improve the uptime and reliability of these systems. For example, one technique to improve uptime currently used in computer systems with multiple processors involves disabling a processor that has an internal failure. Upon detecting that a processor has an internal failure, the processor is held in a reset state. Holding the failed processor in the reset state effectively tri-states the outputs of the failed processor, allowing other processors attached to the common buses to continue operating.

However, there is a significant problem in attempting to allow computer systems with multiple processors to operate using this technique. A processor can fail due to a problem within the processor itself, or the processor may fail due to a problem with a voltage regulator providing power to the processor. When the problem is internal to the processor, the technique of holding the processor in the reset state, as discussed above, may disable the processor and allow the multiple processor system to continue operating. However, if the processor fails due to a problem with a voltage regulator supplying power to the processor, simply attempting to hold the processor in the reset state may not allow the system to continue operating without the processor.

The technique of holding the processor in the reset state may not work when the problem is associated with a voltage regulator supplying power to the processor, because the processor requires power in order to correctly tri-state the processor inputs and outputs. The failed processor inputs and outputs need to be tri-stated due to the fact that other processors are connected to the same data, control, and address buses. Without proper tri-stating, the inputs and outputs of the failed processor will hold signal lines in the buses in bad states, preventing the other processors from functioning properly.

The architectures of many multi-processor systems require the core voltages for each processor be independent of core voltages for other processors during normal operation. Consequently, if the voltage supply or voltage regulator fails for a problem processor, the processor cannot be properly tri-stated due to the lack of voltage. Most often, the core voltage plane is isolated from other voltage planes and no other source of core voltage is available. The end result is that a failure of a single voltage regulator in computer with multiple processors will prevent the computer from operating. There is, therefore, a need for methods and apparatuses that allow a multiple processor computer to operate when one of the voltage regulators fails.

SUMMARY

The problems identified above are in large part addressed by methods and apparatuses to provide voltage to a processor when a voltage source, such as a voltage regulator, is defective. One embodiment comprises a method for supplying power to a processor in a computer system with multiple processors. The method generally involves monitoring a parameter that is related to a first voltage potential coupled to the processor. When the parameter or condition monitored indicates that the first voltage is bad or faulty, the method involves isolating the voltage from the processor, disabling or resetting the processor, and coupling a second voltage potential to the processor. The method may also allow the computer system to continue operating with the processor disabled. In various embodiments, the isolation of the first voltage potential, the disabling of the processor, and the coupling of the second voltage potential may be accomplished by using such devices as switches, transistors, and relay contacts.

Another embodiment comprises an apparatus for supplying voltage to a processor in a computer system with multiple processors. The apparatus may comprise an error detection circuit for detecting an error related to a first voltage regulator, a disabling circuit to disable the first voltage regulator in response to the error, a processor isolating circuit, and a voltage switching circuit to supply voltage from a second voltage regulator to the processor. All of the elements of the apparatus may exist in a single device referred to as a service processor. The apparatus may utilize transistors, switches, and relay contacts to isolate the voltage regulator, isolate the processor, and switch the processor to the second voltage regulator.

A further embodiment comprises a multi-processor computer system comprising two or more processors, two or more voltage regulation devices to supply voltage to the processors, a voltage error detection module for sensing a problem with the voltage regulation modules, a voltage isolation module for isolating a problematic voltage regulation module, and a voltage switching module to couple at least one of the remaining voltage regulation modules to any processors affected by the problematic voltage regulation module. The computer system may also contain, in other embodiments, a processor disabling module to disable one or more of the processors affected by the problematic voltage regulation module.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variation of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, apparatuses, and systems for supplying power to processors in a multiple processor computer system are disclosed. New techniques for switching power between the processors after detecting voltage errors are discussed. Embodiments comprise a method of monitoring a computer system with multiple processors being powered by multiple voltage sources and switching power among the processors once a voltage error is detected. In these embodiments, apparatus software and/or hardware may detect that voltage to one or more processors is outside an acceptable range and react by switching voltage from an alternate source and isolating the affected processor(s).

In some embodiments, voltage is switched between two processor using two independent voltage regulators. In other embodiments, voltage may be switched between virtually any number of processors, such as three, four, eight, or more. Similarly, voltage to the processors may be derived from a number of different sources. In many embodiments, voltage may be switched using a semiconductor device, such as a field effect transistor. In other embodiments, voltage to the processors may be switched using relays or other switching devices.

The method of sensing and responding to different voltage problems varies in different embodiments. In some embodiments, a voltage control unit may simply detect loss of voltage from a voltage regulator. In other embodiments, a voltage control unit may monitor more subtle voltage error conditions, such as voltage falling below a threshold value. In even further embodiments, a service processor may monitor voltage errors by monitoring a single status bit from a voltage regulator or from a processor being powered by the regulator. As for responding to the various errors, the voltage control unit in some embodiments may respond by supplying a processor affected by the voltage error from an unaffected voltage source and holding the processor in a reset state. In other embodiments the voltage control unit may respond differently, such as holding a status input to the processor high which may tell the processor to float its inputs and outputs.

While portions of the following detailed discussion describe many embodiments comprising new techniques for supplying power to microprocessors in computer systems having multiple microprocessors, a person of ordinary skill in the art will recognize that the following invention may be practiced using many different types of processors in a variety of processor-based computer systems, such as processors implemented in multiple-board computers and even mainframe systems. While the embodiments are discussed as having processors coupled to a single bus, such as a data bus or a memory access bus, various embodiments may simultaneously be coupled with multiple buses. Further, embodiments discuss switching voltage among the processors using transistors and relays, but one of ordinary skill in the art will recognize that the techniques disclosed herein may utilize an almost endless variation of switching devices. All configurations and methods of practicing the invention are interchangeable for alternative embodiments when employed in accordance with similar constraints to perform substantially equivalent functions.

Figure 1:
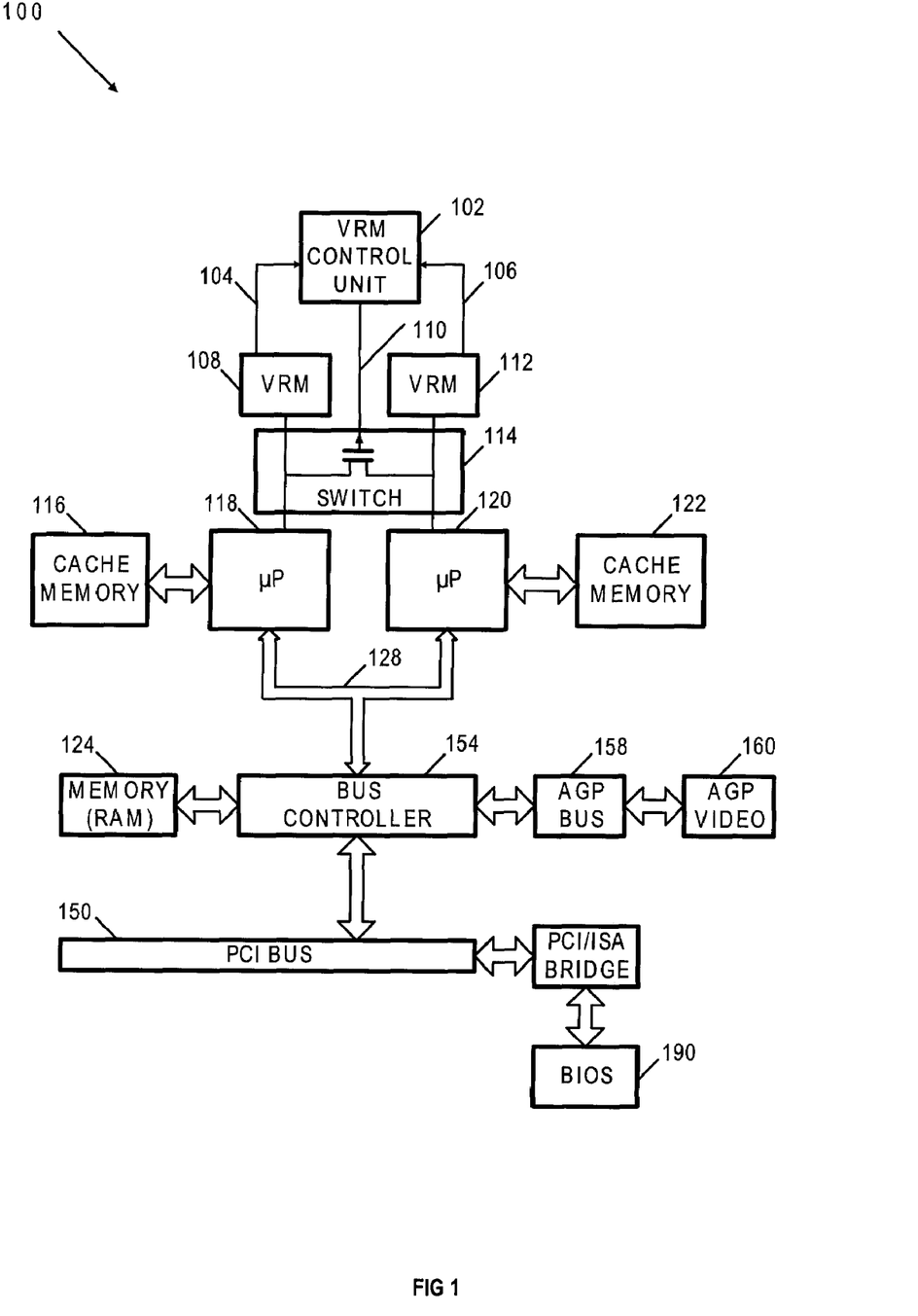
FIG. 1 depicts a multiple processor computer system having two processors, two voltage regulator modules, and an apparatus for switching between the two regulator modules.

We turn now to FIG. 1, which depicts a multiple processor computer system 100 having two processors, two voltage regulator modules, and an apparatus for switching between the two regulator modules. More specifically, computer system 100 shown in FIG. 1 has a first microprocessor 118 and a second microprocessor 120 coupled in parallel to a bus controller 154 via a single bus segment 128. In various embodiments, bus segment 128 may couple processors 118 and 120 to buses of varying widths. For example, in some systems bus segment 128 may comprise an 8 bit bus segment. In other embodiments, bus segment 128 may comprise a 16, 32, or an even greater number of bit bus.

Coupled with bus controller 154 are an accelerated graphics port (AGP) bus 158, a peripheral component interconnect (PCI) bus 150, and a bank of random access memory (RAM) 124. While in this embodiment microprocessor 118 and microprocessor 120 share the bank of RAM 124 and comprise a shared memory computer system, other embodiments may have microprocessors arranged in other fashions. For example, instead of microprocessor 118 and microprocessor 120 sharing one bank of memory, other embodiments may arrange microprocessors 118 and 120 with separate and dedicated memory banks, such as would be the case in a distributed memory computer system.

Microprocessors 118 and 120 may work in tandem, using AGP bus 158 and an AGP video card 160 to display information to a user of computer system 100 by way of a cathode-ray-tube monitor. In other embodiments, the display device may be a liquid crystal display screen or a thin-film transistor flat panel monitor. Additionally, various embodiments may display information to a user with another type of display adapter, different than AGP video card 160, such as a legacy industry standard architecture (ISA) card. In even further embodiments, microprocessors 118 and 120 may be embedded in a computing device having no display at all.

Computer system 100 may have a basic input-output system (BIOS) program stored in a BIOS module 190. Included in the BIOS module 190 may be a Power-On-Self-Test (POST) code, or program, which causes microprocessors 118 and 120 to perform a number of predefined tests on system hardware after applying power to computer system 100. For example, the POST program may test the computer system and check various ports and USB ports for I/O devices, such as a keyboard and a mouse.

As depicted in FIG. 1, computer system 100 may have microprocessor 118 coupled with cache memory 116. Similarly, computer system 100 may have microprocessor 120 coupled with cache memory 122. Such cache memory devices may help increase the performance of the individual processors in various embodiments. However in some embodiments one or more processors, similar to microprocessors 118 and 120, may have multiple cache memory devices coupled with individual microprocessors, have cache memory devices coupled with multiple microprocessors, and even have one or more microprocessors with no cache memory devices.

Also as depicted in FIG. 1, computer system 100 may have a voltage regulation module (VRM) 108 providing power to microprocessor 118 and a different VRM 112 supplying power to microprocessor 120 via a switching module 114. During normal operation, switching module 114 may isolate the voltages from VRM 108 and VRM 112, such that VRM 108 supplies voltage to microprocessor 118 while VRM 112 supplies voltage to microprocessor 120. If either VRM 108 or VRM 112 fails, a voltage regulator control unit 102 may detect such failures from status input lines 104 and 106, respectively, and activate switching module 114 via an output switching control line 110. Activating switching module 114 may couple voltage from the non-failing VRM to the processor normally fed from the failing VRM. Such coupling of a backup voltage in this manner may allow the affected processor to be placed in a bypass mode, such that it ceases normal operations and allows other processors and devices coupled with bus controller 154 to operate normally.

For example, suppose that computer system 100 is operating in a normal mode with microprocessor 118 receiving voltage from. VRM 108. Similarly, microprocessor 120 is receiving voltage from VRM 112. VRM control unit 102 may detect that both VRM 108 and VRM 112 are operating properly, by monitoring the state of the two status input lines, 104 and 106, respectively. Sensing that both VRM 108 and VRM 112 are operating properly, VRM control unit 102 may cause switching module 114 to uncouple the outputs of VRM 108 and VRM 112, such that each VRM output is isolated from the other output. In this normal mode of operation, switching module 114 may couple voltage from VRM 108 only to microprocessor 118, and voltage from VRM 112 only to microprocessor 120. Suppose, however, that VRM 108 fails and ceases supplying any voltage at its output. With a lack of operating voltage supplied by VRM 108, microprocessor 118 may cease operating. Unfortunately, with a total absence of operating voltage applied to microprocessor 118, the output signal lines in bus segment 128 may be held low prohibiting the proper operation of microprocessor 120 with bus controller 154. To remedy this problem, microprocessor 118 may be placed in a bypass mode and provided a sufficient voltage is applied to it. Such voltage may be provided from another VRM module, such as VRM 112, which may still be operating properly.

VRM control unit 102 may detect that VRM 108 has failed by sensing an absence of voltage present at status input line 104. Accordingly, VRM 102 may activate switching control line 110 and couple the output of VRM 112 with microprocessor 118 via switching module 114. With sufficient voltage now being supplied to microprocessor 118 from VRM 112, microprocessor 118 may now be reset and held in a bypass state so that microprocessor 120 may properly interact with bus controller 154. Obviously, the reverse scenario may occur. That is, VRM 112 may fail, affecting microprocessor 120. VRM control unit 102 may then activate switching module 114, coupling voltage from VRM 108 to microprocessor 120 so that it may be bypassed and allow microprocessor 118 to continue operating.

Figure 2:
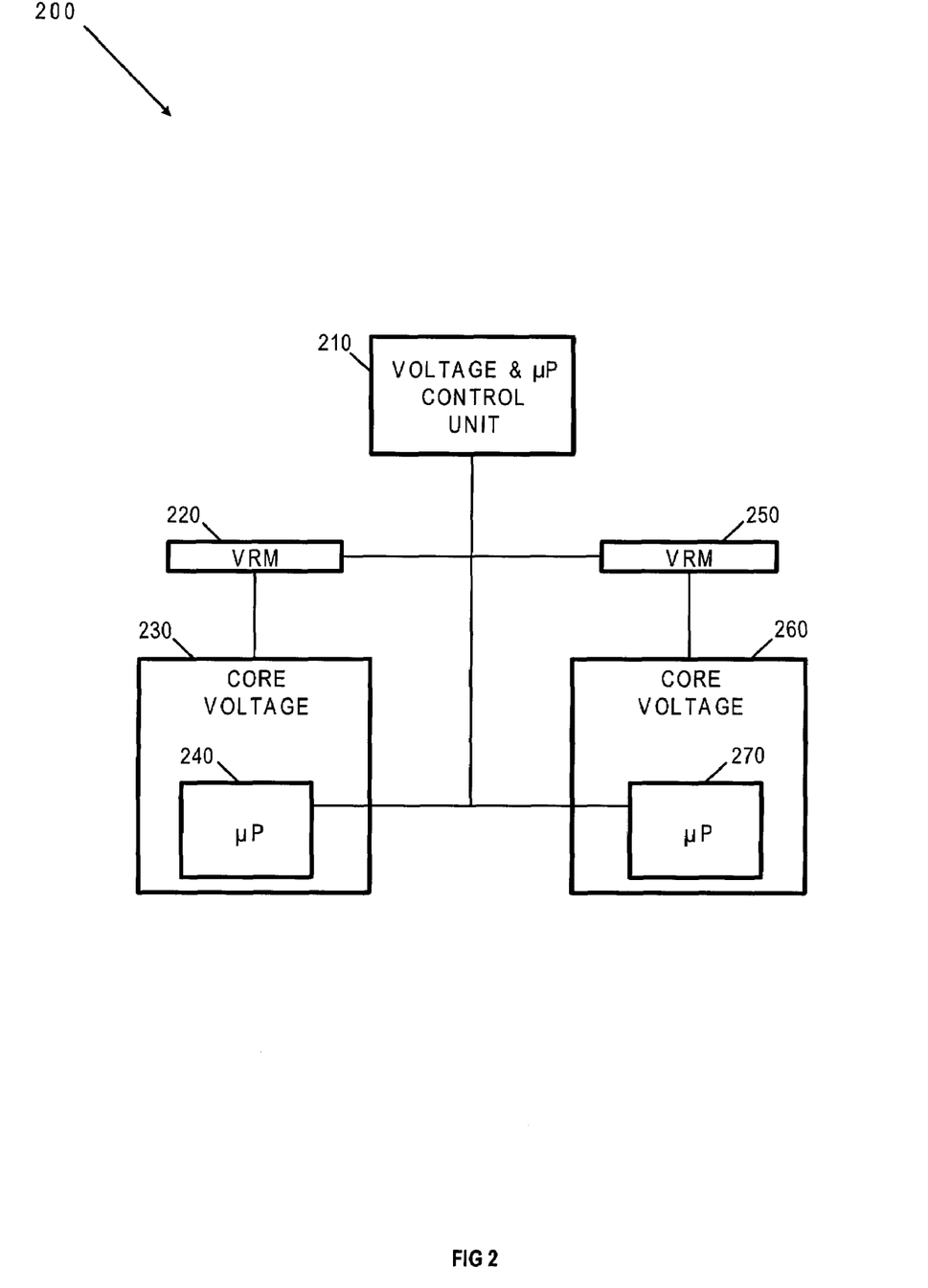
FIG. 2 depicts an apparatus for controlling core voltages to two processors.

In order to better explain how voltage and power may be supplied to processors in a multi-processor system, we continue now with a more detailed discussion of how various embodiments may detect voltage errors, isolate the voltage errors, and disable processors in the system. FIG. 2 depicts an apparatus 200 for controlling two core voltages, core voltage 230 and core voltage 260. In some embodiments, apparatus 200 may be implemented entirely in a semiconductor substrate and comprise a single integrated circuit. In other embodiments, one or more components of apparatus 200 may exist as discrete electronic devices coupled together by wires or other conductive materials, such as by electrical traces on one or more printed circuit boards.

As shown in FIG. 2, core voltage 230 may provide operating voltage and current to microprocessor 240. Similarly core voltage 260 may provide operating voltage and current to microprocessor 270. During normal operation, VRM 220 may generate or supply core voltage 230, while VRM 250 may supply core voltage 260. Microprocessors 240 and 270 may be two processors in a multiple processor computer system configured in a variety of different computer architectures, such as a shared memory architecture. Additionally, microprocessors 240 and 270 may utilize various techniques for processing data, such as pipelining, time-sharing, multithreading, interleaving, and overlapping.

A voltage and microprocessor control unit 210 may monitor numerous parameters related to microprocessor 240, microprocessor 270, and the voltages supplied by VRM 220 and VRM 250. For example, control unit 210 may monitor the voltages supplied by VRM 220 and VRM 250 to ensure that both voltages are within a proper voltage range. In some embodiments, control unit 210 may monitor such voltages to ensure that they do not fall below some minimum operating threshold value. In other embodiments, control unit 210 may simply monitor status bits generated by internal diagnostic circuitries within VRM 220 and VRM 250. In other words, each VRM may have its own diagnostic circuitry, monitoring such voltage parameters as voltage level, voltage sag, voltage sag durations, voltage noise, ripple, and other such measures of voltage quality. Monitoring of such voltage parameters may be performed in the VRM or in control unit 210, depending on the embodiment.

Upon detecting a voltage error related to either VRM 220 or VRM 250, control unit 210 may respond in a variety of different ways depending on the embodiment. In some embodiments, control unit 210 may first disable the processor affected by the faulty or erroneous VRM, disable the faulty VRM, couple voltage from the working VRM to both microprocessor 240 and microprocessor 270, and hold the processor normally coupled to the faulty VRM in a transparent state. Holding a processor in a transparent state in this manner may allow one or more remaining processors of a computer system to continue operating. In some embodiments, each individual VRM module may have sufficient current generating capability to supply both microprocessor 240 and microprocessor 260, allowing the affected microprocessor to simply be reset by control unit 210 and allowing it to continue operating as well.

In other embodiments, control unit 210 may detect and respond to voltage errors in a different manner. For example, control unit 210 may monitor status bits from microprocessors 240 and 270, such that a loss of either bit would correspond to an erroneous voltage being supplied to the processor. In other words, the microprocessors may perform the voltage monitoring. Upon loss of either of the status bits, control unit 210 may respond by disabling the faulty VRM, coupling another VRM to the affected processor, and holding the affected processor in a reset state, effectively tri-stating its input and output lines so that any other system processor or device connected to the same input and output lines may continue functioning. In even further embodiments, control unit 210 may monitor core voltages 230 and 260 directly, detecting voltage errors in control unit 210.

Figure 3:
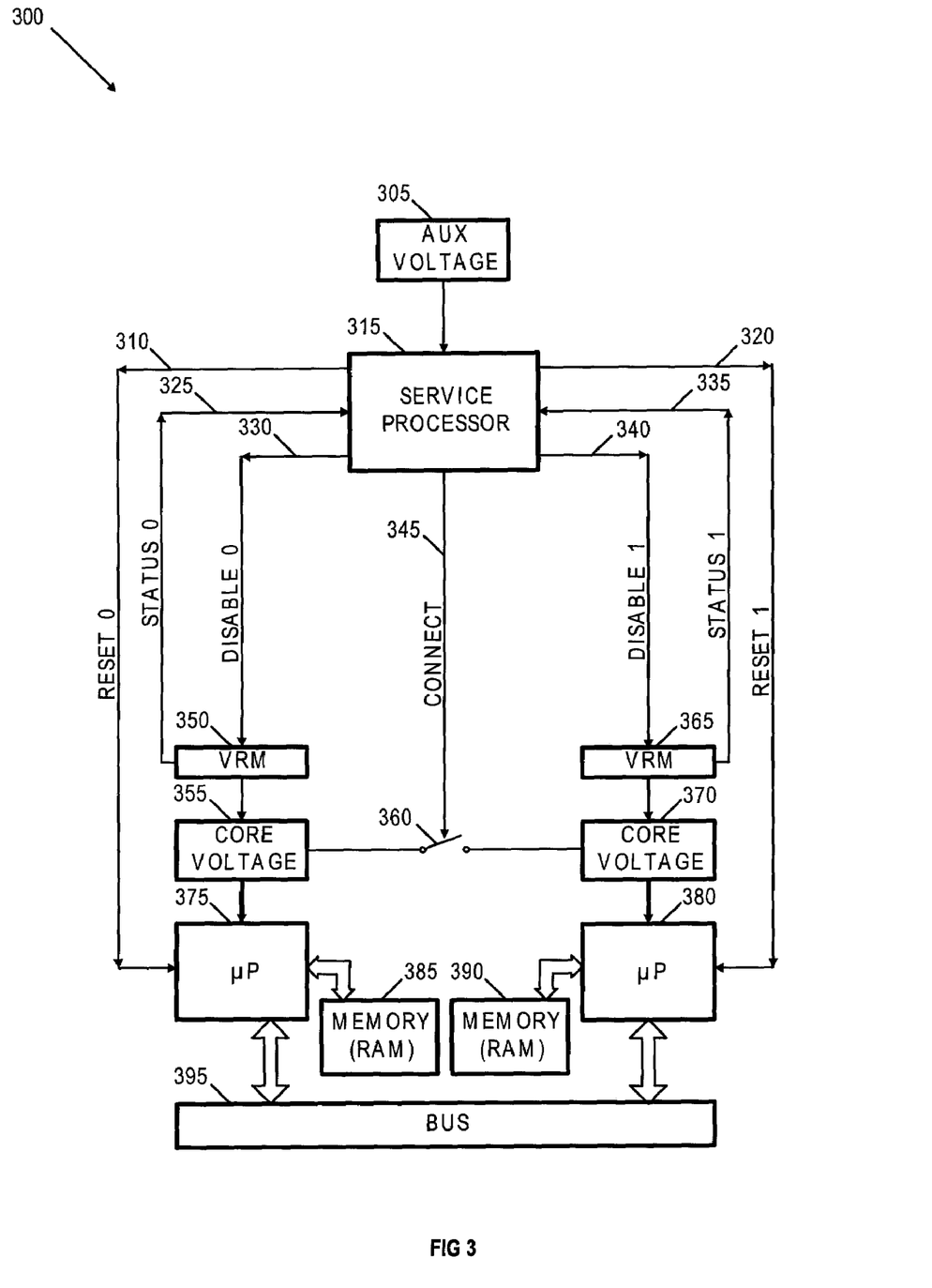
FIG. 3 depicts a system drawing having a service processor for controlling voltage from two voltage regulator modules in a two-processor computer system.

To provide a more explicit example of how power may be redistributed to a processor in a multiple processor computer system, we move to FIG. 3. FIG. 3 depicts a computer system 300 having a service processor 315 for controlling voltage from two voltage regulator modules, VRM 350 and VRM 365, supplying power to two microprocessors, 375 and 380. Microprocessor 375 may have dedicated RAM 385 and microprocessor 380 may have dedicated RAM 390. Both microprocessors 375 and 380 may be coupled to a single system bus 395, forming what may be a distributed memory multi-processor computer system 300.

During normal operation, VRM 350 may supply a regulated and filtered core voltage 355 for microprocessor 375. Similarly, VRM 365 may supply a core voltage 370 for microprocessor 380. Core voltage 355 and core voltage 370 may both be distributed via copper planes for microprocessors 375 and 380. With both VRM 350 and VRM 365 functioning properly, both microprocessors 375 and 380 may utilize core voltages 355 and 370, respectively, to operate in tandem transferring data to and from RAM 385 and 390. Additionally, each microprocessor may communicate data to and from other devices in computer system 300 by way of system bus 395. Also during normal operation, service processor 315 may monitor the statuses of VRM 350 and VRM 365 via independent status lines 325 and 335, respectively.

In the event that one of the voltage regulator modules becomes defective and experiences an error, service processor 315 may detect the error from either status line 325 or status line 335 and respond by resetting the affected microprocessor, disabling the defective voltage regulator, and coupling core voltages 355 and 375 by activating output connect line 345 and closing switch 360. Stating it another way, service processor 315 may detect whenever a voltage regulator has an error and respond by disabling the regulator and supplying voltage to the affected processor from the working regulator so that the processor may be bypassed so that computer system 300 may continue operating. Service processor 315 may continue to operate upon the loss of either VRM 350 or VRM 365, provided processor 315 is fed from an auxiliary voltage source, such as auxiliary voltage 305.

For example, assume that computer system 300 is operating normally with both VRM 350 and VRM 365 supplying power to microprocessor 375 and microprocessor 380, respectively. Service processor 315 may deactivate output connect line 345, opening switch 360. If VRM 365 experiences an internal failure, status line 335 may transition to a logical zero. Service processor 315 may detect this transition of status line 335 and respond by disabling VRM 365 by transitioning control output 340 from a logical one to a logical zero, the end result disabling VRM 365. Service processor 315 may also set microprocessor 380 to a reset state by transitioning control output 320 from a logical zero to a logical one. Additionally, service processor 315 may route power from VRM 350 to microprocessor 380 by activating output connect line 345 and closing switch 360. Closing switch 360 may cause VRM 350 to provide just enough power from core voltage 355 to core voltage 370 so that microprocessor 380 may properly tri-state its input-output lines. Tri-stating microprocessor 380 input-output lines in this fashion, by having service processor 315 hold control output 320 at a logical one, may isolate microprocessor 380 from system bus 395 allowing microprocessor 375 to continue operating and communicating with other devices coupled to system bus 395.

Similar to disabling VRM 365 and powering microprocessor 380 from VRM 350, service processor 315 may disable VRM 350 and power microprocessor 375 from VRM 365 using control output 330, control output 310, and output connect line 345. Additionally, service processor 315 may accomplish these functions in different embodiments by transitioning the control outputs from low to high, or from high to low depending on the configurations of VRM 350, VRM 365, microprocessor 375, and microprocessor 380. In other words, the control outputs may be activated by either raising the lines from high to low or from low to high, depending on the configurations of the voltage regulators, the microprocessors, and the switching device.

In various embodiments, the exact sequence executed by service processor 315 in bypassing the voltage regulator and disabling the microprocessor may be changed but accomplish the same tasks. For example, in some embodiments the service processor may first disable the defective VRM, set the microprocessor, and then couple the voltage planes together. Yet in other embodiments the service processor may first set the microprocessor to the reset state, then disable the defective VRM, and finally close the voltage switch. The exact order of the controlling the various output control lines may not be critical, depending on the components of computer system 300.

Figure 4:
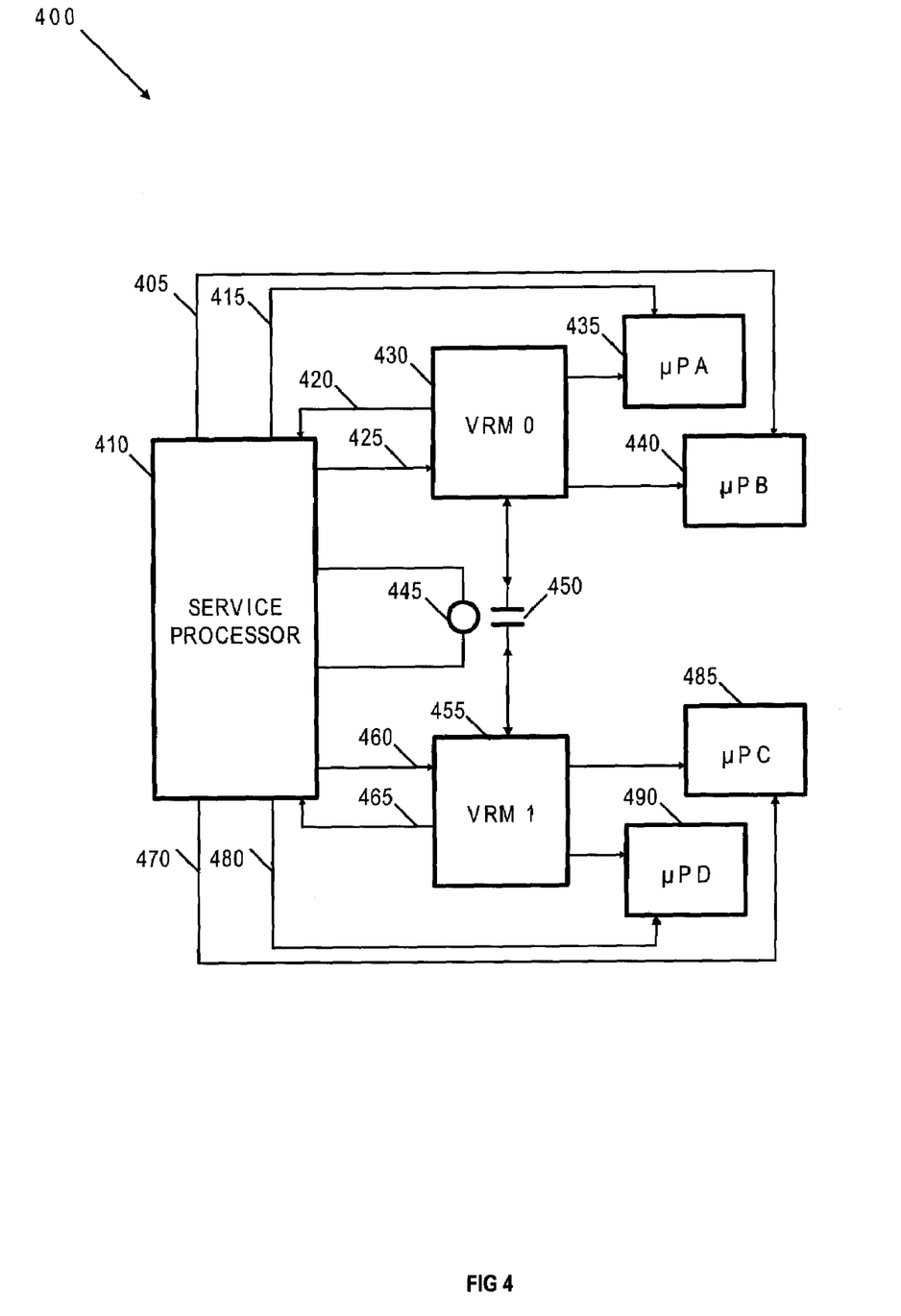
FIG. 4 depicts a multiple processor computer system with four processors and two voltage regulator modules, with a service processor to control voltage to the processors.

Turning now to FIG. 4, we see a multiple processor computer system 400. As shown in FIG. 4, computer system 400 may have differing numbers of processors powered from differing numbers of voltage regulators. More specifically, computer system 400 may have two microprocessors, microprocessor 435 and microprocessor 440, powered by a first VRM 430. Similarly, a second VRM 455 may power microprocessor 485 and microprocessor 490. Note how computer system 400 in FIG. 4 differs from computer system 100 in FIG. 1, computer system 300 in FIG. 3, and apparatus 200 in FIG. 2. While the previous systems and apparatuses had only two microprocessors and two voltage regulator modules, computer system 400 employs two VRMs, 430 and 455, powering four microprocessors, microprocessors 435, 440, 485, and 490. As stated, different embodiments may contain varying numbers of voltage regulators and microprocessors, depending on such things as the needs of the application, the power demands of the processors, and the power ratings of the regulators.

In computer system 400, VRM 430 may provide power to microprocessor 435 and microprocessor 440 during normal operation. Likewise, VRM 455 may provide normal operating power to microprocessor 485 and 490. Service processor 410 may monitor the status of VRM 430 by status line 420 and monitor the status of VRM 455 by status line 465. If, for the sake of explanation, a voltage error occurs in VRM 455, service processor 410 may detect the error by way of status line 465 and respond by disabling microprocessor 485 and microprocessor 490 by triggering control outputs 470 and 480, respectively. Service processor 410 may then disable VRM 455, by altering the state of control output 460, and couple power to microprocessor 485 and 490 by energizing relay 445. Energizing relay 445 may close relay contact 450, coupling voltage and power from VRM 430 to microprocessors 485 and 490.

In alternative embodiments, service processor 410 may not need to disable or bypass all microprocessors associated with a voltage regulator. For example, suppose VRM 430 fails. Service processor 410 may respond by disabling VRM 430 by activating control output 425 and energizing relay 445 to close relay contact 450. Suppose further that VRM 455 has a large enough power rating to supply power to three microprocessors, but not four. Service processor 410 may not need to disable both microprocessor 435 and microprocessor 440. Instead, service processor 410 may attempt to maximize the number processors operating in computer system 400 and only disable either microprocessor 440 with control output 405 or microprocessor 435 with control output 415.

Figure 5:
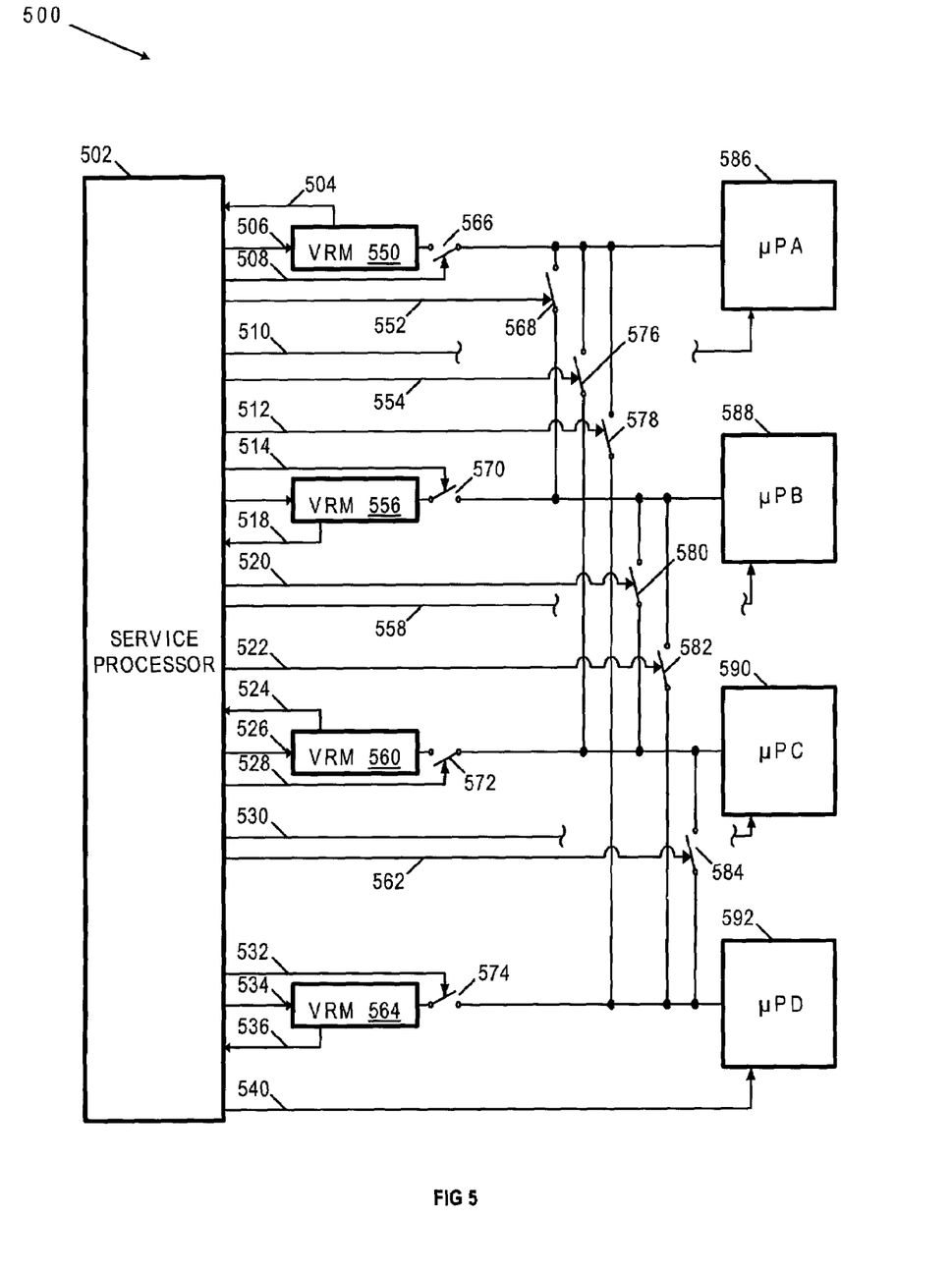
FIG. 5 shows how a service processor may control voltages from four voltage regulators to four processors.

To examine a more flexible and detailed configuration we turn now to FIG. 5, which shows an alternative technique of how a service processor may control voltages from several voltage regulators to several processors. Computer system 500 has four processors, processor 586, 588, 590, and 592, normally powered from four voltage regulator modules, 550, 556, 560, and 564, respectively. During normal operation, service processor 502 may activate control outputs 508, 514, 528, and 532 to close switches 566, 570, 572, and 574, respectively, coupling voltage from the VRMs to the individual processors. Service processor 502 may monitor VRMs 550, 556, 560, and 564 via VRM status lines 504, 518, 524, and 536, respectively.

The configuration of computer system 500 shown in FIG. 5 may offer much more switching flexibility when one or more VRMs fails. For example, assume that both VRM 550 and VRM 560 fail. Service processor 502 may detect these failures via status lines 504 and 524 and respond by activating control output lines 506 and 526, to disable the VRMs, and altering the control outputs 508 and 528 to open switches 566 and 572 to isolate the outputs of the VRMs from microprocessor 586, microprocessor 590, and the interconnect wiring at the outputs of all VRMs. Service processor 502 may continue by disabling processor 586 by activating control output 510 and disabling processor 590 by activating control output 530. Service processor 502 may then route power from VRM 556 to microprocessor 586 by activating control output 552 and closing switch 568. Similarly, service processor 502 may route power from VRM 564 to microprocessor 590 by activating control output 562 and closing switch 584. Alternatively, service processor 502 may route power from VRM 556 to microprocessor 590 by activating control output 520 and closing switch 580, and route power from VRM 564 to microprocessor 586 by activating control output 512 and closing switch 578.

In alternative embodiments, the switching network employed by computer system 500 in FIG. 5 may offer even more flexibility and redundancy over several other embodiments, depending on any previous failures that computer system 500 may have already experienced. For example, assume that microprocessor 588 has previously experienced an internal failure. Service processor 502 may have already detected this failure and disabled processor 588 by activating control output 558. However, service processor 502 may have also detected that VRM 556 still has a good voltage status from status line 518. Consequently, control output 514 may still be active and switch 570 still closed. Suppose, however, that computer system 500 experiences a failure of VRM 564, which service processor 502 detects via status input 536. Service processor 502 may disable microprocessor 592 by activating control output 540, disable VRM 564 by activating control output 534, and isolating VRM 564 by activating control output 532 to open switch 574.

Service processor 502 may then proceed by simply routing power from VRM 550 to microprocessor 592 by activating control output 512 and closing switch 578, or alternatively supplying power from VRM 560 by activating control output 562 and closing switch 584. However, service processor 502 may be configured to recognize that microprocessor 588 has already been disabled, which may mean that VRM 556 may be available to power an alternate microprocessor since the power drain may be sufficiently low for disabled microprocessor 588. If so, service processor 502 may activate control output 522 to close switch 582, thereby coupling power from VRM 556 to microprocessor 592. Service processor 502 may then place microprocessor 592 back into service by deactivating the disable command from control output 540.

Worth emphasizing is the fact that the output of each of the VRMs may be coupled to every one of the other outputs of the other VRMs. VRM 550 may be coupled to: microprocessor 588 by activating control output 552 and closing switch 568; microprocessor 590 by activating control output 554 and closing switch 576; microprocessor 592 by activating control output 512 and closing switch 578. Similarly, VRM 556, VRM 560, and VRM 564 may be coupled to each of the microprocessors individually by activating control outputs 552, 554, 512, 520, 522, and 562 to close switches 568, 576, 578, 580, 582, and 584, respectively.

Figure 6:
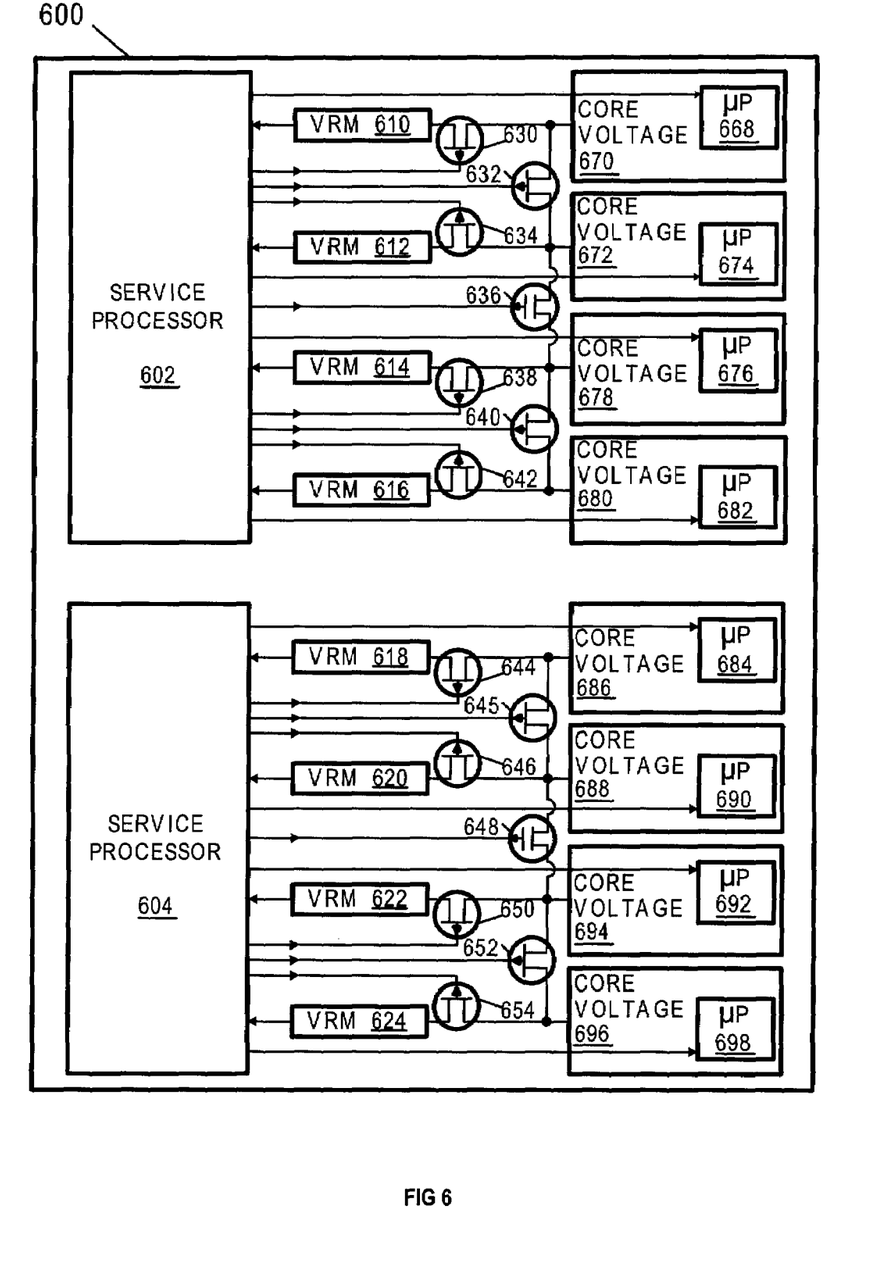
FIG. 6 depicts a computer system having eight microprocessors, eight voltage regulator modules, and two service processors for switching voltage among the microprocessors.

FIG. 6 depicts what may be a larger computer system 600 having eight microprocessors and employing two service processors for switching voltage among the microprocessors. One will note that computer system 600 differs from previously discussed embodiments by the utilization of dual service processors, the previous embodiments having a single service processor or voltage control unit. This contrasting implementation may help illustrate how different embodiments may have varying numbers of service processors, configured with varying numbers of voltage regulation modules and varying numbers of microprocessors.

More specifically, computer system 600 has a first service processor 602 monitoring four VRMs, 610, 612, 614, and 616, with corresponding core voltages of 670, 672, 678, and 680. Service processor 602 also controls the voltage supplied to four microprocessors 668, 674, 676, and 682 by switching transistors 630, 632, 634, 636, 638, 640, and 642. In a mirror-like fashion, a second service processor 604 may monitor four VRMs 618, 620, 622, and 624, with corresponding core voltages of 686, 688, 694, and 696. Service processor 604 may also control the voltage supplied to four microprocessors 684, 690, 692, and 698 by switching transistors 644, 645, 646, 648, 650, 652, and 654.

Implementing computer system 600 with two service processors instead of one may have many desirable benefits, such as more simple service processor design. Alternatively, splitting processors and voltage regulators in this fashion may be necessary because of hardware requirements. For example, computer system 600 may comprise a computer system in a server network. Dividing multiple processors among various server processors may be necessary in a server system, due to spacing and heat loading requirements. That is to say, service processor 602 and all associated VRMs and microprocessors may reside on one printed circuit board and plug into rack-mounted computer system hardware. Maximum allowable circuit dimensions, determined by the application or hardware enclosure dimensions, may require that service processor 604 and all associated VRMs and microprocessors reside on a separate printed circuit board.

Similar to the previously described examples, service processors 602 and 604 may monitor and control the various VRMs, transistors, and microprocessors coupled with them. For example, during normal operation service processor 604 may couple the output voltages from VRMs 618, 620, 622, and 624 to the respective core voltages 686, 688, 694, and 696. Service processor 604 may couple the voltages by biasing the gates of P-type field effect transistors (P-fets) 644, 646, 650, and 654 to a ground potential to turn them on, while coupling the gates of P-fets 645, 648, and 652 to a positive voltage supply, such as Vdd, to turn them off and isolate the cross-coupling lines connecting the outputs of the different VRMs.

Upon sensing a failure in one of the VRMs, service processor 604 may switch the states of one or several of the transistors in order to couple the voltage from an alternate functioning VRM to the processor affected by the failed VRM, so that the affected processor may be held in the reset state, bypassed, or placed back in service, similar to the techniques previously discussed. For example, suppose that VRM 622 fails, affecting the voltage plane for core voltage 694 and microprocessor 692. Service processor 604 may respond by biasing the gate of P-fet 650 to Vdd in order to isolate the voltage output of VRM 622 from the microprocessors and other VRM outputs. Service processor 604 may then couple an output from one of the other VRMs to supply core voltage 694 and microprocessor 692. One possible coupling scenario may involve coupling the output of VRM 620 with core voltage 694 and microprocessor 692 by biasing the gate of P-fet 648 to ground. Stating what may readily be apparent, the voltage output of VRM 624 may also be coupled with core voltage 694 and microprocessor 692 by switching P-fet 652.

Service processor 602 may operate in a similar manner to that described for service processor 604. Also, in other embodiments, service processors may couple the voltage outputs of the VRMs using devices other than P-fets. For example, some embodiments may utilize only N-type fets, or combinations of P-fets and N-fets. Also, in further embodiments, other circuit devices may work in conjunction with the fets, switches, or contacts. For example, the switching P-fets for computer system 600 depicted in FIG. 6 may have capacitive and resistive elements coupled with the transistors in order to provide such benefits as de-bouncing, smoother switching, and reduced inductive kick-back. Also, while not specifically mentioned in the discussions for the previous embodiments, adding other circuit devices in various embodiment components, such as the switching networks, is equally applicable.

Additionally, service processors and voltage control units for various embodiments may be relatively simple, such as relatively minor and simple arrangements of logic gates. However, in other embodiments, the service processors and voltage control units may comprise relatively complex processors, with internal clock generators, memory, processing coded instructions, and software programs to perform the processor acts of disabling and voltage switching.

Figure 7A:
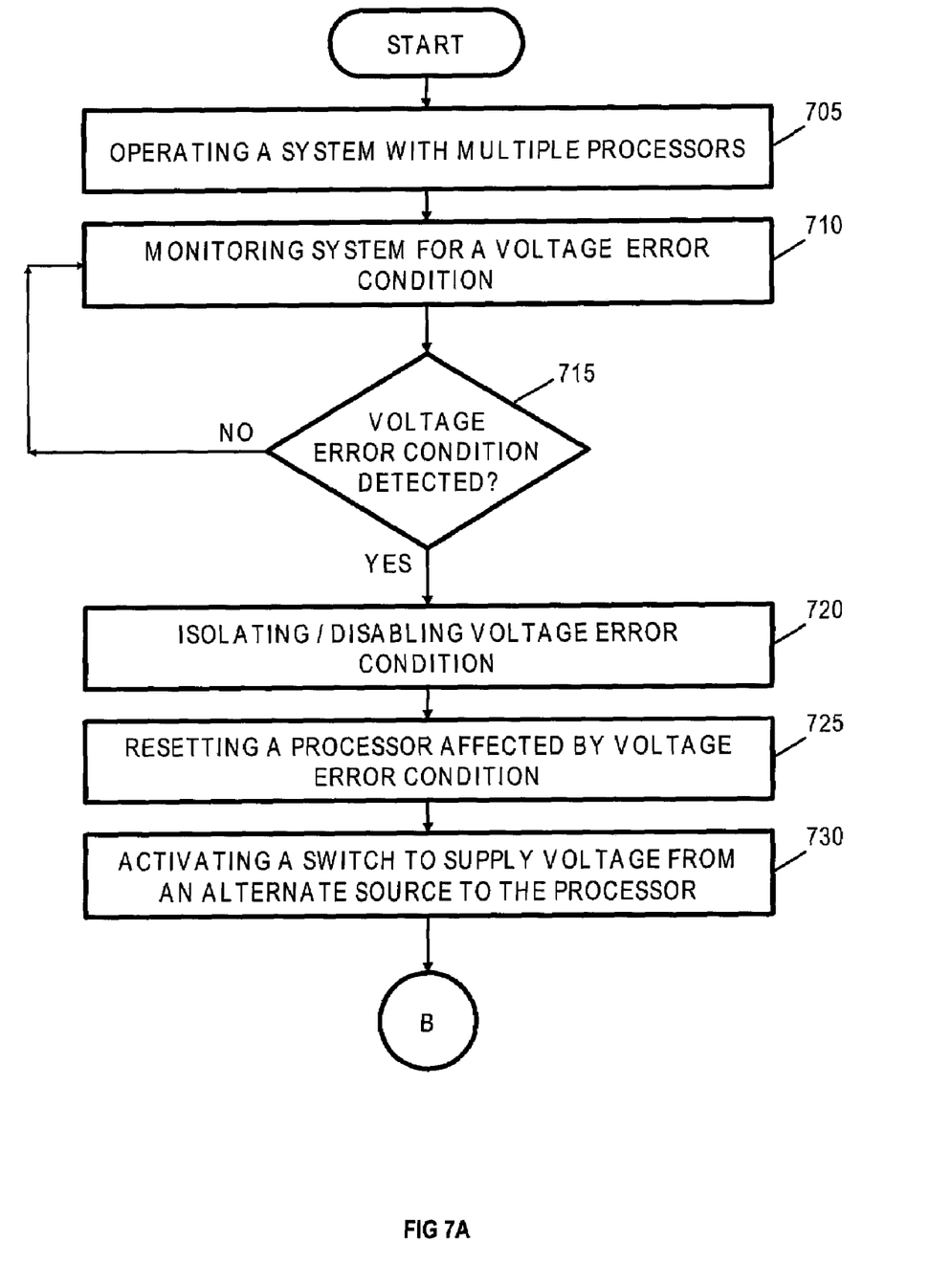
FIGS. 7A-7B illustrate a method for operating a multiple processor computer when one of the processor voltage regulators experiences an error.
Figure 7B:
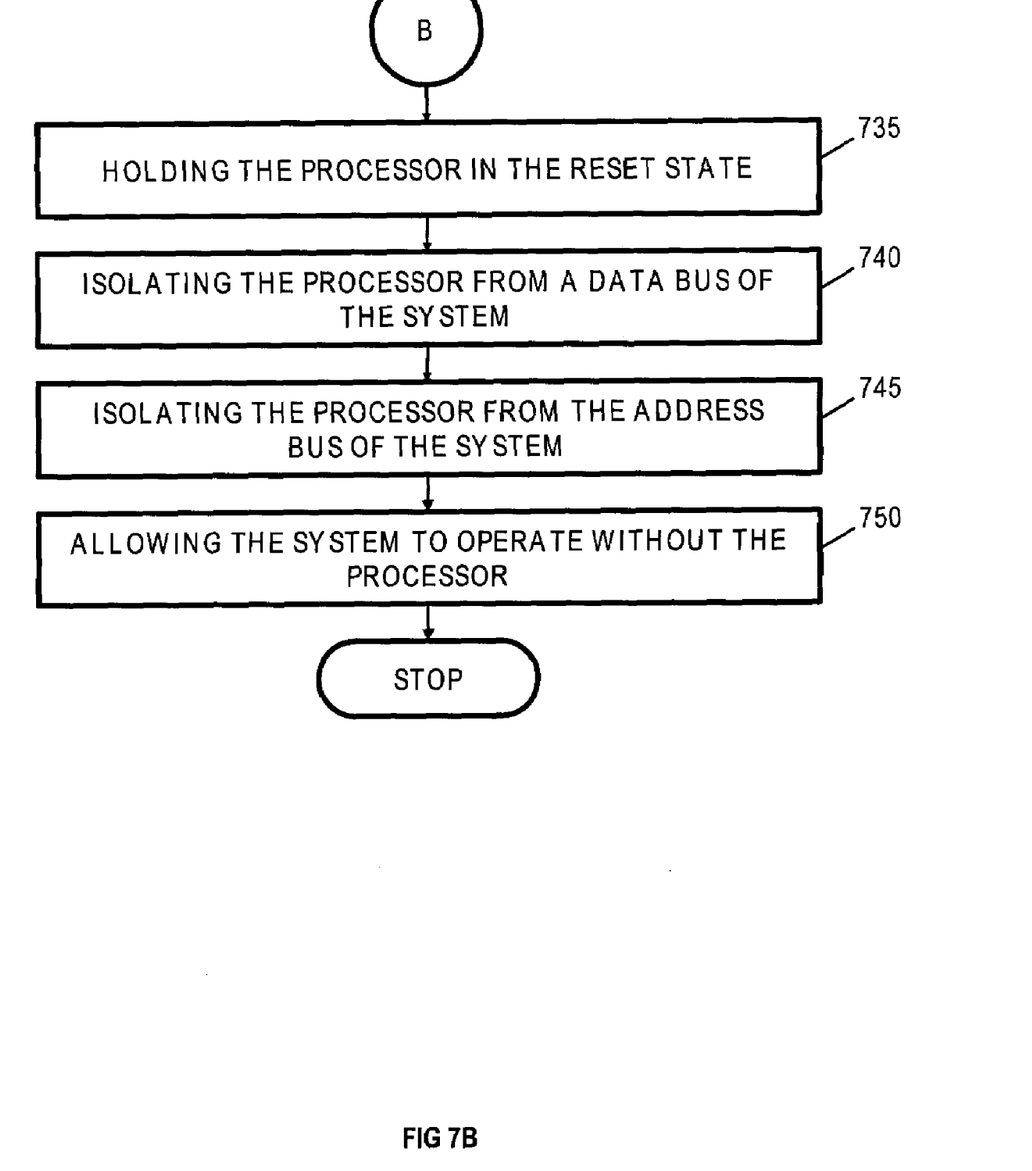

We turn now to FIGS. 7A and 7B, which illustrate a method for operating a multiple processor computer when a processor voltage regulator experiences an error. FIG. 7A begins with operating a system with multiple processors (element 705). Different embodiments may have the multiple processors arranged with different computer architectures, such as shared memory computer architectures, distributed memory architectures, and combinations or derivations of both. The processors may all be coupled together with a single bus, or clusters of processors may be coupled together by way of more smaller and individual processor group buses.

The method of FIG. 7A may continue by monitoring the multiprocessor computer system for a voltage error condition (element 710). The error condition monitored may change with different embodiments. For example, in some embodiments, the error condition may be the absence of one or more of the VRMs needed by the microprocessors. In other embodiments, the error condition may be a lack of a good core voltage. As long as no error condition is detected, the actions required by the method may involve nothing but simply continuing to monitor for an error condition (elements 715 and 710). However, once an error condition is detected, a system according to the method of FIG. 7A may proceed by isolating or disabling the voltage error condition (elements 715 and 720). For example, a computer system functioning according to the method of 7A may isolate or prohibit a voltage from being fed to the input of a defective voltage regulator. Alternatively, an embodiment may isolate a bad voltage regulator by opening a switch coupled between the regulator output and regulator load.

An embodiment according to FIG. 7A may proceed by resetting a processor affected by the voltage error condition (element 725) and activating a switch to supply voltage from an alternate source to the affected processor (element 730). In some embodiments, the alternate source may be another voltage regulator in the system. However, in other embodiments, the alternate voltage source may be an unfiltered and unregulated voltage source.

Once the affected processor is reset (element 725), the processor may be held in the reset state (element 735), which may tri-state the inputs and outputs associated with the affected processor from an address bus (element 745), allowing other processors in the computer system to operate unimpeded by the disabled or bypassed processor (element 750). In various embodiments, the affected processor may be isolated from other buses in the system. For example the processor may be isolated from a data bus or a control bus, or combinations of all three types of buses.

Another embodiment of the invention is implemented as a program product for use in circuit component devices, such as processors for the service processors, core voltage processors, or even system processors powered by the various voltage sources, in accordance with, e.g., computer system 500 as shown in FIG. 5. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within the computer system); and (ii) alterable information stored on writable storage media (e.g., magnetic media). Such data and/or signal-bearing media, when carrying microprocessor-readable instructions that direct the functions of the present invention, represent embodiments of the present invention.

In general, the routines executed to implement the embodiments of the invention, may be part of an operating system or a specific component, program, module, object, or sequence of instructions contained within memory of the a circuit board device. The microprocessor program of the present invention may be comprised of a multitude of instructions that will be translated by the microprocessor into a machine-readable format and hence executable instructions. Also, the programs may be comprised of variables and data structures that either reside locally to the program or are found in memory or other storage devices. In addition, various programs described hereinafter may be identified based upon the application for which they are implemented in a specific embodiment of the invention. However, it should be appreciated that any particular aforementioned program nomenclature is used merely for convenience, and thus the invention should not be limited to use solely in any specific application identified and/or implied by such nomenclature.

One skilled in the art of computing and multiple processor computer system design will readily appreciate the flexibility and opportunities that the various embodiments for supplying power to processors in a multi-processor computer system afford the field of multiple processor computing systems. These examples are only a few of the potential cases wherein the methods of supplying power to processors in a multi-processor system, or machines and media that accomplish essentially the same, provide the field of multi-processor computer system design.

It will be apparent to those skilled in the art having the benefit of this disclosure that the present invention contemplates methods, apparatuses, and media to apply power to and bypass processors in a multiple processor computer system when a component fails. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for supplying voltage to a processor in a computer system with multiple processors, the apparatus comprising:
    an error detection circuit, to detect an error condition related to a first voltage regulator module supplying voltage to the processor;
    a disabling circuit to disable the first voltage regulator module upon the error detection circuit detecting the error;
    a processor isolating circuit to place the processor in an isolation state upon the error detection circuit detecting the error, wherein one or more of the processor inputs and outputs are isolated from a bus in the computer system while in the isolation state; and
    a voltage switching circuit to supply voltage from a second voltage regulator module to the processor upon the error detection circuit detecting the error, wherein the error detection circuit, the disabling circuit, the processor isolating circuit, and the voltage switching circuit comprise a service processor.

2. The apparatus of claim 1, further comprising a disable output coupled to the disabling circuit to disable the first voltage regulator module.

3. The apparatus of claim 1, further comprising a voltage switching output coupled to the voltage switching circuit to activate a transistor that couples the second voltage regulator module to the processor.

4. The apparatus of claim 1, wherein the error detection circuit is adapted to detect absence of voltage from the first voltage regulator module.

5. The apparatus of claim 1, wherein the disabling circuit comprises a transistor to electrically isolate the first voltage regulator module from the processor.

6. The apparatus of claim 1, wherein the processor isolating circuit is adapted to hold the processor in a reset state.

7. The apparatus of claim 1, wherein the voltage switching circuit comprises a transistor to couple the second voltage regulator to the processor.

8. An apparatus for supplying voltage to a processor in a computer system with multiple processors, the apparatus comprising:
    an error detection circuit, to detect an error condition related to a first voltage regulator module supplying voltage to the processor;
    a disabling circuit to disable the first voltage regulator module upon the error detection circuit detecting the error, wherein the disabling circuit comprises a transistor to electrically isolate the first voltage regulator module from the processor;
    a processor isolating circuit to place the processor in an isolation state upon the error detection circuit detecting the error, wherein one or more of the processor inputs and outputs are isolated from a bus in the computer system while in the isolation state; and
    a voltage switching circuit to supply voltage from a second voltage regulator module to the processor upon the error detection circuit detecting the error.

9. The apparatus of claim 8, further comprising a disable output coupled to the disabling circuit to disable the first voltage regulator module.

10. The apparatus of claim 8, further comprising a voltage switching output coupled to the voltage switching circuit to activate a transistor that couples the second voltage regulator module to the processor.

11. The apparatus of claim 8, wherein the error detection circuit is adapted to detect absence of voltage from the first voltage regulator module.

12. The apparatus of claim 8, wherein the processor isolating circuit is adapted to hold the processor in a reset state.

13. The apparatus of claim 8, wherein the voltage switching circuit comprises a transistor to couple the second voltage regulator to the processor.

14. The apparatus of claim 8, wherein the processor isolating circuit is arranged to cause the processor to tri-state at least one of its outputs.

15. The apparatus of claim 8, wherein the error condition comprises one of an absence of voltage, a voltage below an acceptable value, and a status signal from the first voltage regulator module.

16. An apparatus for supplying voltage to a processor in a computer system with multiple processors, the apparatus comprising:
- an error detection circuit, to detect an error condition related to a first voltage regulator module supplying voltage to the processor;
- a disabling circuit to disable the first voltage regulator module upon the error detection circuit detecting the error;
- a processor isolating circuit to place the processor in an isolation state upon the error detection circuit detecting the error, wherein one or more of the processor inputs and outputs are isolated from a bus in the computer system while in the isolation state; and
- a voltage switching circuit to supply voltage from a second voltage regulator module to the processor upon the error detection circuit detecting the error, wherein the voltage switching circuit comprises a transistor to couple the second voltage regulator to the processor.

17. The apparatus of claim 16, further comprising a disable output coupled to the disabling circuit to disable the first voltage regulator module.

18. The apparatus of claim 16, further comprising a voltage switching output coupled to the voltage switching circuit to activate a transistor that couples the second voltage regulator module to the processor.

19. The apparatus of claim 16, wherein the error detection circuit, the disabling circuit, the processor isolating circuit, and the voltage switching circuit comprise a service processor.

20. The apparatus of claim 16, wherein the error detection circuit is adapted to detect absence of voltage from the first voltage regulator module.

21. The apparatus of claim 16, wherein the disabling circuit comprises a transistor to electrically isolate the first voltage regulator module from the processor.

22. The apparatus of claim 16, wherein the processor isolating circuit is adapted to hold the processor in a reset state.

\* \* \* \* \*